Patented Mar. 24, 1936

2,035,153

UNITED STATES PATENT OFFICE 2,035,153

STABLE SOLUTIONS OF DIHYDROXY-DIAMINO-ARSENOBENZENE AND ITS DERIVATIVES

Franz Elger, Basel, Switzerland, assignor to Hoffmann-La Roche Inc., Nutley, N. J., a corporation of New Jersey No Drawing. Application June 15, 1935, Serial No. 26,828. In Switzerland July 6, 1934

7 Claims. (Cl. 167—69)

Solutions of dihydroxy-diamino-arsenobenzene and its derivatives are subject to ready and rapid decomposition which renders them unsuitable for therapeutic use. The decomposition is due probably to an oxidizing process. It has now been found that the oxidation and subsequent decomposition of the said solutions may be prevented by adding ascorbic acid or salts of ascorbic acid.

*Example 1*

6 parts by weight of dihydroxy-diamino-arsenobenzene-sodium-methylene-sulphonate are dissolved in a solution of 3 parts by weight of ascorbic acid in 60 parts by volume of water while adding enough sodium hydroxide solution to bring the pH to 6.5. The 10% solution of dihydroxy-diamino-arsenobenzene-sodium-methylene-sulphonate thus obtained is of a clear light yellow colour and is not decomposed when left to stand for some considerable time unprotected from the air, whereas a similar solution, to which no ascorbic acid has been added, quickly turns dark brown.

*Example 2*

4.66 parts by weight of dihydroxy-diamino-arsenobenzene-sodium-methylene-sulphonate are mixed with 4 parts by weight of sodium ascorbate. The powder thus obtained yields neutral aqueous solutions, which are stable.

I claim:

1. Stable solutions of dihydroxy-diamino-arsenobenzene and its derivatives, containing ascorbic acid in an amount sufficient to stabilize the solution.

2. Stable solutions of dihydroxy-diamino-arsenobenzene and its derivatives, containing salts of ascorbic acid in an amount sufficient to stabilize the solution.

3. Stable solutions of dihydroxy-diamino-arsenobenzene and its derivatives, containing the sodium salt of ascorbic acid in an amount sufficient to stabilize the solution.

4. Stable solutions of dihydroxy-diamino-arsenobenzene-sodium-methylene-sulphonate, containing ascorbic acid in an amount sufficient to stabilize the solution.

5. Stable solutions of dihydroxy-diamino-arsenobenzene-sodium-methylene-sulphonate, containing salts of ascorbic acid in an amount sufficient to stabilize the solution.

6. Stable solutions of dihydroxy-diamino-arsenobenzene-sodium-methylene-sulphonate, containing the sodium salt of ascorbic acid in an amount sufficient to stabilize the solution.

7. Stable solutions of dihydroxy-diamino-arsenobenzene and its derivatives, containing a compound selected from the group consisting of ascorbic acid and the salts of ascorbic acid in an amount sufficient to stabilize the solution.

FRANZ ELGER.